(12) United States Patent
Holmes et al.

(10) Patent No.: US 6,478,705 B1
(45) Date of Patent: Nov. 12, 2002

(54) HYBRID ELECTRIC POWERTRAIN INCLUDING A TWO-MODE ELECTRICALLY VARIABLE TRANSMISSION

(75) Inventors: Alan G. Holmes, Fishers, IN (US); Michael Roland Schmidt, Carmel, IN (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/907,827

(22) Filed: Jul. 19, 2001

(51) Int. Cl.$^7$ ................................................ F16H 3/72
(52) U.S. Cl. ........................................................... 475/5
(58) Field of Search ........................................ 475/2, 5

(56) References Cited

U.S. PATENT DOCUMENTS

| | | | |
|---|---|---|---|
| 5,577,973 A | * | 11/1996 | Schmidt .......................... 475/5 |
| 5,931,737 A | | 8/1999 | Schmidt .......................... 475/2 |
| 6,371,878 B1 | * | 4/2002 | Bowen ........................... 472/5 |

* cited by examiner

*Primary Examiner*—Dirk Wright
(74) *Attorney, Agent, or Firm*—Leslie C. Hodges

(57) ABSTRACT

A hybrid electric powertrain includes an electrically variable transmission having two differential gearsets coupled to an engine and first and second electrical machines, wherein the gearsets are configurable in input-split and compound-split modes, and wherein shifting between the input-split and compound-split modes occurs at a zero speed point of one of the electric machines for synchronous clutch engagement. The input-split mode provides reverse and low forward ranges, with the first machine operated as a motor and the second as a generator. The compound-split mode provides a high forward range, with the machines selectively operated in motoring or generating modes depending on the speed of the vehicle. Shifting between the input-split and compound-split modes occurs synchronously, and at a zero speed of the first machine, contributing to an exceptionally smooth shift.

9 Claims, 3 Drawing Sheets

HYBRID ELECTRIC POWERTRAIN INCLUDING A TWO-MODE ELECTRICALLY VARIABLE TRANSMISSION

TECHNICAL FIELD

This invention relates to a hybrid electric powertrain, including an electrically variable transmission operable in input-split and compound-split modes.

BACKGROUND OF THE INVENTION

An electrically variable transmission utilizes one or more electric machines and a differential gearing arrangement to provide a continuously variable ratio drive, and is particularly useful in hybrid electric powertrains including an engine that is operated at a constant speed. Such a powertrain is shown and described in the U.S. Pat. No. 5,931,757 to Schmidt, issued on Aug. 3, 1999, and assigned to the assignee of the present invention. In Schmidt, the differential gearing arrangement provides a compound split mode of operation in which the input power is divided into two power paths through a first differential gearing arrangement and then combined at the output through a second differential gearing arrangement. Operation over a wide output speed range without requiring undesirably high electric machine speeds is achieved by using clutches to reconfigure or shift the gearing arrangement at a mid-range output speed. The principle object of this invention is to provide a hybrid electric powertrain that exhibits the advantages of the Schmidt powertrain, but with reduced mechanical complexity and improved ease of control.

SUMMARY OF THE INVENTION

The present invention is directed to an improved hybrid electric powertrain including an electrically variable transmission having two differential gearsets coupled to an engine and first and second electrical machines, wherein the gearsets are configurable in input-split and compound-split modes, and wherein shifting between the input-split and compound-split modes occurs at a zero speed point of one of the electric machines for synchronous clutch engagement. The input-split mode provides reverse and low forward ranges, with the first machine operated as a motor, and the second as a generator. The compound-split mode provides a high forward range, with the machines selectively operated in motoring or generating modes depending on the speed of the vehicle. Shifting between the input-split and compound-split modes occurs synchronously, and at a zero speed of the second machine, contributing to an exceptionally smooth shift. In the illustrated embodiment, the differential gearsets include first and second planetary gearsets having coupled planet carriers, with the transmission output coupled to the planet carriers, the first machine coupled to the sun gear of the second gearset, the second machine coupled to the sun gear of the first gearset, and the engine coupled to the ring gear of the first gearset. A first clutch grounds the ring gear of the second gearset during the input-split mode, and a second clutch couples the ring gear of the second gearset to the sun gear of the first gearset during the compound-split mode.

DESCRIPTION OF THE PREFERRED EMBODIMENT

Figure 1:
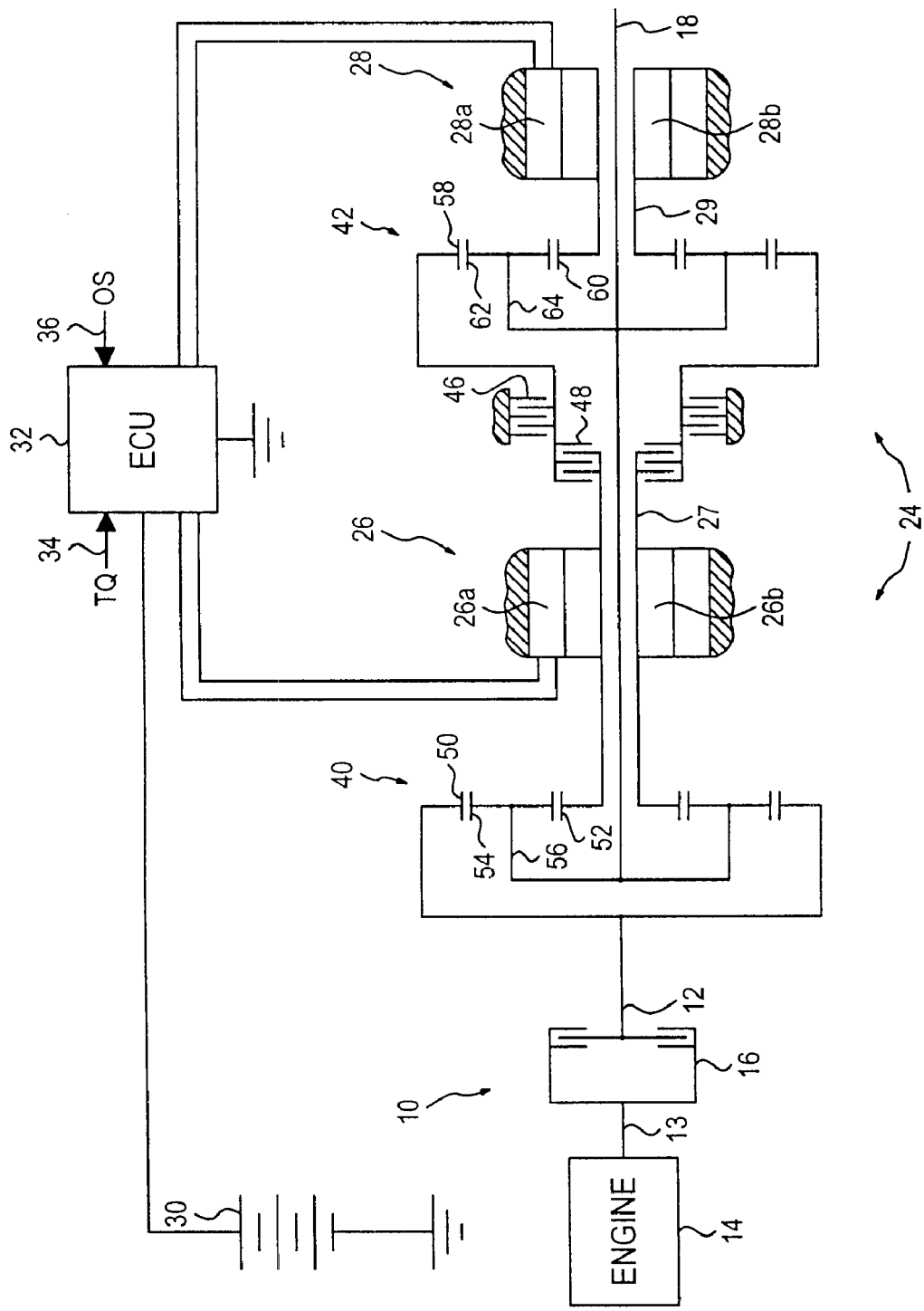
FIG. 1 is a schematic representation of one preferred form of a hybrid electric powertrain embodying the concepts of the present invention.

Referring to FIG. 1, the reference numeral 10 generally designates a hybrid electric powertrain including a two-mode electrically variable transmission 24. The transmission 24 has an input shaft 12 coupled to the output shaft 13 of an internal combustion engine 14 via input clutch 16. Engine 14 may take a variety of different forms, but as explained below, is preferably designed for constant speed operation during forward vehicle motion subsequent to a vehicle launch phase. An output shaft 18 of transmission 24 may be coupled to the vehicle drive wheels through a conventional differential gearset (not shown).

The transmission 24 includes two planetary gearsets 40, 42 and two electrical machines 26, 28 coupled to the gearsets 40, 42, with machines 26 and 28 being coaxially aligned with the gearsets 40, 42 as shown. A storage battery 30 is provided for supplying current to machines 26 and/or 28 when operating in a motoring mode, and receiving charging current from machines 26 and/or 28 when operating in a generating mode. An electronic control unit (ECU) 32, including a microprocessor-based controller and suitable inverter circuitry, couples the battery 30 to machines 26, 28, and controls the same in response to various input signals, including the driver torque request signal (TQ) on line 34 and the output shaft speed signal (OS) on line 36. In a preferred embodiment, the machines 26, 28 are configured as induction machines, although other configurations are also possible. Thus, machine 26 is depicted as having a fixed stator 26a electrically coupled to ECU 32 and a rotor 26b mounted on a sleeve shaft 27 of transmission 10. Similarly, machine 28 is depicted as having a fixed stator 28a electrically coupled to ECU 32 and a rotor 28b mounted on sleeve shaft 29.

In addition to the planetary gearsets 40, 42, the transmission 24 includes a pair of selectively engaged friction clutches 46, 48. In customary fashion, each planetary gearset 40, 42 includes an outer (ring) gear circumscribing an inner (sun) gear, and a plurality of planet gears rotatably mounted on a carrier such that each planet gears meshingly engage both the outer gear and the inner gear. Thus, the gearset 40 includes a ring gear 50, a sun gear 52, and a set of planet gears 54 mounted on a carrier 56; the gearset 42 includes a ring gear 58, a sun gear 60, and a set of planet gears 62 mounted on a carrier 64. As shown in FIG. 1, the ring gear 50 is coupled to the input shaft 12, the planet carriers 56 and 64 are interconnected for common rotation with output shaft 18, the sun gear 52 is coupled to the rotor 26b of electric machine 26 via sleeve shaft 27, and the sun gear 60 is coupled to the rotor 28b of electric machine 28 via sleeve shaft 29. Additionally, the clutch 46 selectively couples the ring gear 58 to ground, and the clutch 48 selectively couples the ring gear 58 to the sleeve shaft 27.

A first mode of operation providing Reverse and Lo-Forward speed ranges is established by engaging clutch 46 and releasing clutch 48. This may be described as an input-split mode, with the gearset 40 operating in a differential mode, and the gearset 42 operating in a torque multiplication mode. A second mode of operation providing a High-Forward speed range is established by engaging clutch 48 and releasing clutch 46. This may be described as a compound-split mode, with both gearsets 40, 42 operating in a differential mode. A neutral state is established by releasing both clutches 46 and 48. Logic for controlling engagement and disengagement of the clutches 46, 48 is performed by the ECU 32, which controls suitable solenoid-operated mechanisms (not shown) for carrying out the desired engagement states. The machines 26 and 28 are also operated by ECU 32. In the first mode, machine 26 is operated as a generator and machine 28 is operated as a motor; in the second mode, the machines 26 and 28 are selectively operated in the motoring and generating modes depending on output speed, as explained below in reference to FIG. 2.

Figure 2:
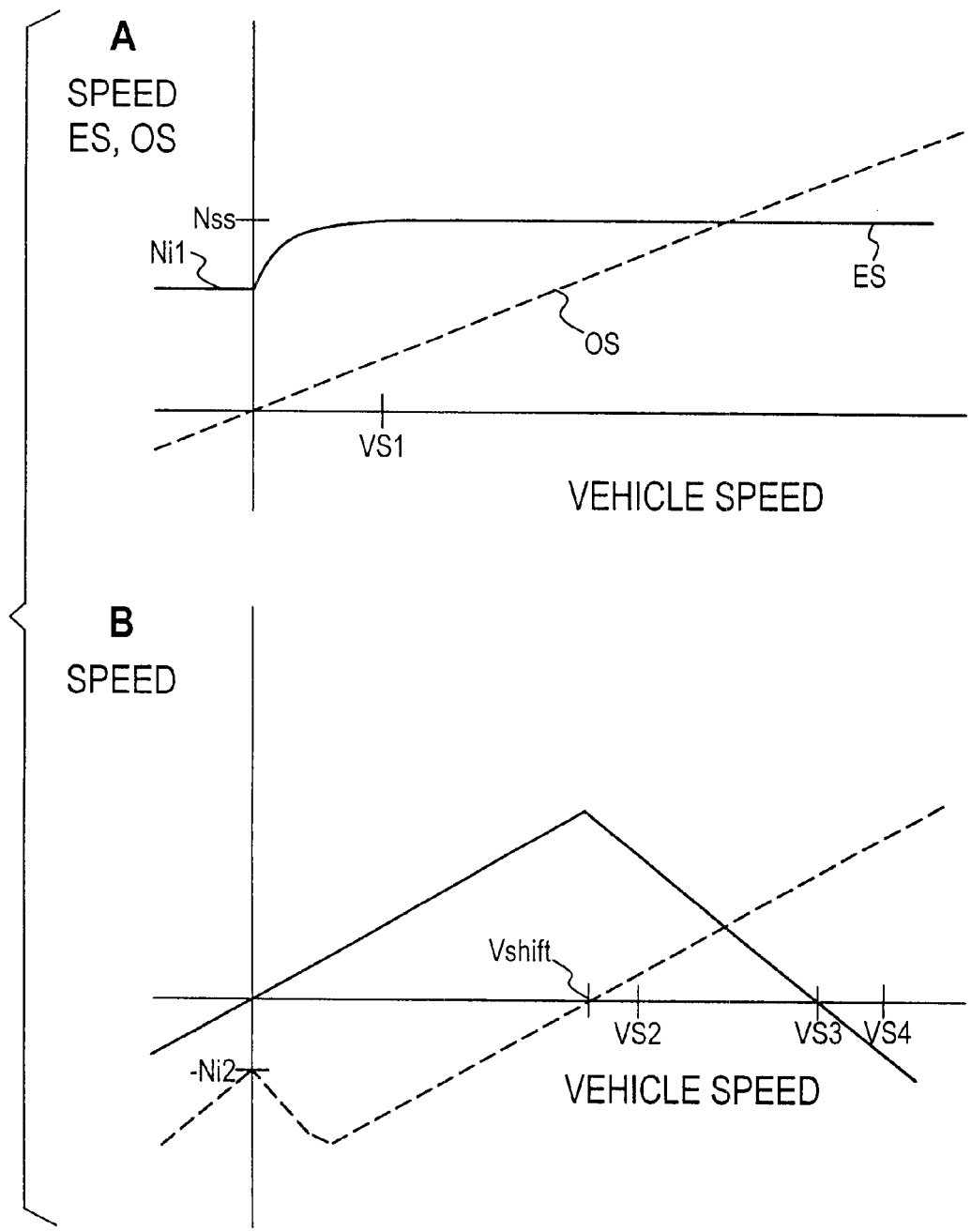
FIG. 2, Graphs A and B, depict the speeds of each electrical machine as well as the engine and transmission output shaft relative to the speed of the vehicle obtained by virtue of the powertrain depicted in FIG. 1.

The two modes of operation are now described in reference to Graphs A–B of FIG. 2. Graph A depicts the speed of engine 14 as a solid trace and the speed of output shaft 18 as a broken trace, both as a function of vehicle speed. Graph B depicts the speed of machine 28 as a solid trace and the speed of machine 26 as a broken trace, both as a function of vehicle speed. The shift between modes occurs at a vehicle speed identified as VSshift; consequently, clutches 46 and 48 are respectively engaged and disengaged at speeds below VSshift, and respectively disengaged and engaged at speeds above VSshift.

When the vehicle is stationary, the engine 14 idles at idle speed +Ni1, and machine 28 is stationary; in this state, the engine 14 drives machine 26 at an idle speed of −Ni2. For Reverse operation, the engine speed remains at idle speed Ni1, and the machine 28 is motored in a reverse direction. This has the effect of driving transmission output shaft 18 in reverse and increasing the driven speed of machine 26 in the negative direction. For Forward operation, the engine speed is progressively increased to a steady-state running speed Nss, while the machine 28 is motored in the forward direction as shown. The increasing engine speed initially drives the machine 26 faster in the negative direction, but when the effect of machine 28 becomes dominant, and the driven speed of machine 26 decreases as shown, while the transmission output shaft 18 is driven in the forward direction in direct proportion to the motored speed of machine 28. At a vehicle speed identified as VS1, the engine 14 reaches its steady-state running speed Nss. Meanwhile, the motored speed of machine 28 continues to increase as shown, until the speed of machine 26 reaches zero at the shift speed VSshift. At such point, the speeds of sun gear 52 and ring gear 58 are substantially equal due to the engagement of clutch 46, so that clutch 48 is engaged (and clutch 46 disengaged) with essentially no resulting torque disturbance. At vehicle speeds between VSshift and VS2, the machines 26 and 28 are both motored in the positive direction, even as the speed of machine 28 is decreased due to the differential operation of gearset 42. When the vehicle speed exceeds VS2, the machine 28 is switched to the generator mode, and the motored speed of machine 28 continues to increase, with the speed of machine 28 reaching zero at vehicle speed VS3. At vehicle speeds above VS3, the machine 28 is motored in the reverse direction to add to the torque produced by machine 26 and engine 14. Finally, the machine 26 is switched to the generator mode for vehicle speeds above VS4.

Figure 3:
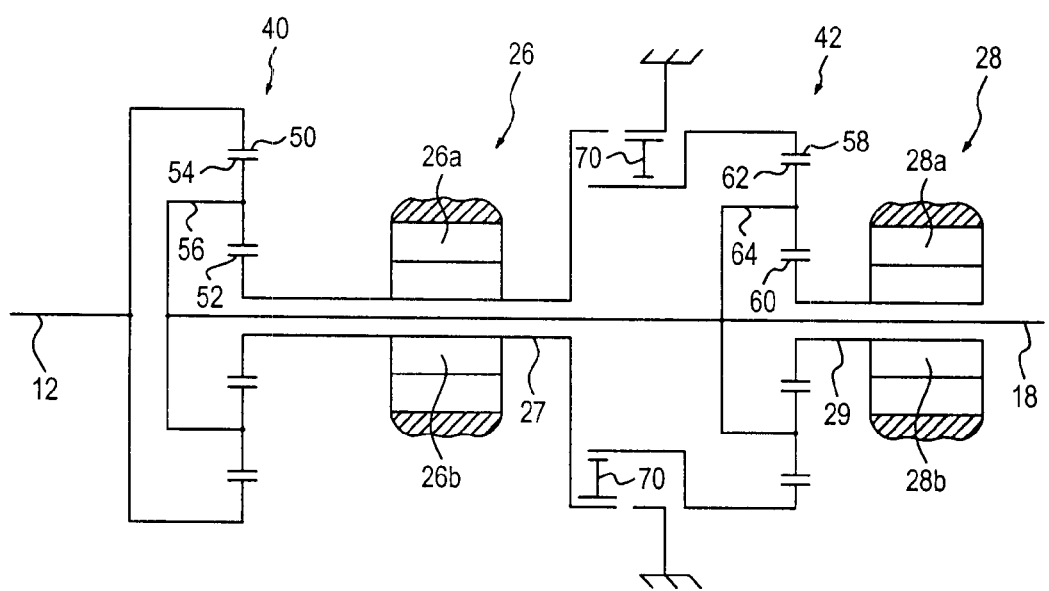
FIG. 3 is a schematic representation of an alternate embodiment of the powertrain of FIG. 1.

In summary, the present invention provides an improved hybrid electric powertrain including an electrically variable transmission having two differential gearsets coupled to an engine and first and second electrical machines, wherein the gearsets are configurable in input-split and compound-split modes, and wherein shifting between the input-split and compound-split modes occurs at a zero speed point of one of the electric machines for synchronous clutch engagement. Since the clutches 46 and 48 selectively connect a single element (ring gear 58) to either ground or sleeve shaft 27, and the shift is performed when the sleeve shaft 27 and ring gear 58 are both at zero speed, the shift occurs synchronously, and the clutches 46, 48 may be combined into a single device such as a double-sided sliding spline clutch or dog clutch. Such an arrangement is illustrated in FIG. 3, where the reference numeral 70 designates a double-sided sliding spline clutch; in the upper half of the diagram, the clutch 70 is positioned to engage the first mode, while in the lower half of the diagram, the clutch 70 is positioned to engage the second mode.

While the present invention has been described in reference to the illustrated embodiments, it is expected that various modification in addition to those mentioned above will occur to those skilled in the art. For example, the starting clutch 16 could be replaced with a fluidic drive such as a torque converter, and the connections of input shaft 12 and machine 26 to gearset 40 may be exchanged. Also, it is possible to establish a third mode of operation in which the clutch 46 remains engaged for vehicle speeds above VSshift; in such case, the machine 26 remains at zero speed, and the engine speed increases in proportion to the vehicle speed. Further, common bevel differential gears or straight differential gearing may be used in place of the planetary gearsets 40, 42, and different planetary configurations are also possible. Thus, it will be understood that electrically variable transmissions incorporating these and other modifications may fall within the scope of this invention, which is defined by the appended claims.

What is claimed is:

1. A hybrid electric powertrain for driving an output member, the powertrain including an engine, first and second coupled and coaxially aligned gearsets, and first and second electric machines co-axially aligned with the gearsets, the improvement wherein:

the output member is coupled to a gear element of each of the first and second gearsets;

the engine and first electric machine are differentially coupled to the first gearset;

the second electric machine is coupled to a gear element of the second gearset; and a clutching mechanism selectively couples a gear element of the second gearset (1) to ground to define an input-split mode of operation, and (2) to the first electric machine to define a compound-split mode of operation.

2. The powertrain of claim 1, wherein shifting between the first and second modes of operation occurs when a speed of the first electric machine is substantially zero.

3. The powertrain of claim 2, wherein:

the input-split mode of operation provides reverse and lower forward speed ranges; and the compound-split mode of operation provides an upper forward speed range.

4. The powertrain of claim 1, wherein:

the clutching mechanism selectively couples the gear element of the second gearset and the first electric machine to ground to define a third mode of operation.

5. An electrically variable transmission having an input and an output, comprising:

first and second co-axially aligned gearsets;

the first gearset having gear elements coupled to the input, the output, and a first electric machine;

the second gearset having gear elements coupled to the output and a second electric machine;

a first clutch mechanism for selectively grounding a mode-changing gear element of the second gearset to define a first mode of operation; and a second clutch mechanism for selectively coupling the mode-changing gear element of the second gearset to the first electric machine to define a second mode of operation.

6. The transmission of claim 5, wherein the first clutch mechanism is disengaged and the second clutch mechanism engaged to effect a shift from the first mode of operation to the second mode of operation when a speed of the first electric machine is substantially zero.

7. The transmission of claim 5, wherein the first and second gearsets are planetary gearsets, and the output is coupled to a planet carrier of the first gearset and a planet carrier of the second gearset.

8. The transmission of claim 5, wherein the first and second gearsets each have a sun gear, a ring gear and a planet carrier, wherein:

the first machine is coupled to the sun gear of the first gearset;

the second machine is coupled to the sun gear of the second gearset;

the input is coupled to the ring gear of the first gearset; and the output is coupled to the planet carriers of the first and second gearsets.

9. The transmission of claim 8, wherein the mode-changing gear element is the ring gear of the second gearset.

* * * * *